United States Patent
Boitard et al.

(10) Patent No.: US 10,334,270 B2
(45) Date of Patent: Jun. 25, 2019

(54) METHOD AND DEVICE FOR PROCESSING IMAGES

(71) Applicant: INTERDIGITAL VC HOLDINGS, INC., Wilmington, DE (US)

(72) Inventors: Ronan Boitard, Belz (FR); Tania Pouli, Le Rheu (FR); Dominique Thoreau, Cesson Sévigné (FR); Rémi Cozot, Rennes (FR); Kadi Bouatouch, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 43 days.

(21) Appl. No.: 15/322,111

(22) PCT Filed: Jun. 17, 2015

(86) PCT No.: PCT/EP2015/063523
§ 371 (c)(1),
(2) Date: Dec. 25, 2016

(87) PCT Pub. No.: WO2015/197436
PCT Pub. Date: Dec. 30, 2015

(65) Prior Publication Data
US 2017/0134745 A1     May 11, 2017

(30) Foreign Application Priority Data

Jun. 25, 2014 (EP) .................. 14305998
Jun. 27, 2014 (EP) .................. 14306016

(51) Int. Cl.
*H04N 19/52* (2014.01)
*H04N 19/513* (2014.01)
(Continued)

(52) U.S. Cl.
CPC ........ *H04N 19/521* (2014.11); *H04N 19/117* (2014.11); *H04N 19/14* (2014.11);
(Continued)

(58) Field of Classification Search
None
See application file for complete search history.

(56) References Cited

U.S. PATENT DOCUMENTS 7,257,273 B2    8/2007  Li et al.
7,483,486 B2 *  1/2009  Mantiuk ............. H04N 19/46
                                           375/240.01
(Continued)

FOREIGN PATENT DOCUMENTS

CN    101371583    2/2009
CN    102696220    9/2012
(Continued)

OTHER PUBLICATIONS

Chiu et al., "Spatially Nonuniform Scaling Functions for High Contrast Images", Proceedings of Graphics Interface 93, May 1993, pp. 245-254.
(Continued)

*Primary Examiner* — Christopher G Findley
(74) *Attorney, Agent, or Firm* — Jeffrey M. Navon

(57) ABSTRACT

A method and device for processing LDR images of a video sequence to improve image quality. The method comprises temporally decomposing successive HDR frames of a video sequence and the corresponding LDR frames and performing a comparison between the HDR and LDR frequency sub-bands. A current LDR image can then be modified on the basis of a comparison between the frequency sub-bands.

14 Claims, 4 Drawing Sheets

(51) Int. Cl.
  *H04N 19/117* (2014.01)
  *H04N 19/14* (2014.01)
  *H04N 19/187* (2014.01)
  *H04N 19/169* (2014.01)
  *H04N 19/86* (2014.01)
  *H04N 19/36* (2014.01)
  *H04N 19/615* (2014.01)
  *H04N 19/31* (2014.01)
  *H04N 19/172* (2014.01)
  *H04N 19/182* (2014.01)

(52) U.S. Cl.
  CPC ....... *H04N 19/187* (2014.11); *H04N 19/1883* (2014.11); *H04N 19/31* (2014.11); *H04N 19/36* (2014.11); *H04N 19/615* (2014.11); *H04N 19/86* (2014.11); *H04N 19/172* (2014.11); *H04N 19/182* (2014.11)

(56) References Cited

U.S. PATENT DOCUMENTS

| | | | |
|---|---|---|---|
| 8,705,621 B2 | 4/2014 | Taubman | |
| 2006/0002611 A1 | 1/2006 | Mantiuk et al. | |
| 2010/0172411 A1 | 7/2010 | Efremov et al. | |
| 2010/0202700 A1* | 8/2010 | Rezazadeh | G06K 9/6215 382/199 |
| 2010/0246939 A1* | 9/2010 | Aisaka | G06T 7/0002 382/156 |
| 2011/0013039 A1* | 1/2011 | Aisaka | H04N 5/142 348/222.1 |
| 2012/0070102 A1* | 3/2012 | Yokokawa | H04N 5/23222 382/286 |
| 2012/0201456 A1 | 8/2012 | El-Mahdy et al. | |
| 2012/0281924 A1* | 11/2012 | Coulombe | H04N 19/85 382/218 |
| 2012/0314103 A1 | 12/2012 | Majewicz et al. | |
| 2015/0030234 A1* | 1/2015 | Lenseigne | G06T 7/0053 382/154 |

FOREIGN PATENT DOCUMENTS

| | | |
|---|---|---|
| CN | 103503026 | 1/2014 |
| WO | WO2010091494 | 8/2010 |

OTHER PUBLICATIONS

Rahman et al., "A Multiscale Retinex for Color Rendition and Dynamic Range Compression", Proceedings of SPIE, Applications of Digital Image Processing XIX, vol. 2847, Nov. 14, 1996, pp. 1-9.

Reinhard et al., "Photographic Tone Reproduction for Digital Images", ACM Transactions on Graphics, vol. 21, No. 3, Jul. 2002, pp. 267-276.

Fattal et al., "Gradient Domain High Dynamic Range Compression", ACM Transactions on Graphics, vol. 21, No. 3, Jul. 2002, pp. 249-256.

Boitard et al., "Zonal Brightness Coherency for Video Tone Mapping", Signal Processing-Image Communication, vol. 29, No. 2, Feb. 2014, pp. 229-246.

Boitard et al., "Survey of Temporal Brightness Artifacts in Video Tone Mapping", HDRi2014—2nd International Conference and SME Workshop on HDR Imaging, Sarajevo, Bosnia and Herzegovina, Mar. 4, 2014, pp. 1-6.

Boitard et al., "Temporal Coherency for Video Tone Mapping", Proceedings of SPIE, Applications of Digital Image Processing XXXV, vol. 8499, Oct. 15, 2012, pp. 1-10.

Guthier et al., "Flicker Reduction in Tone Mapped High Dynamic Range Video", Proceedings of SPIE, Color imaging XVI: Displaying, Processing, Hardcopy, and Applications, vol. 7866, Jan. 23, 2011, pp. 1-15.

Lee et al., "Gradient Domain Tone Mapping of High Dynamic Range Videos", IEEE International Conference on Image Processing, San Antonio, Texas, USA, Sep. 16, 2007, pp. 461-464.

Li et al., "Compressing and Companding High Dynamic Range Images with Subband Architectures", ACM Transactions on Graphics (TOG), vol. 24, No. 3, Jul. 2005, pp. 836-844.

* cited by examiner

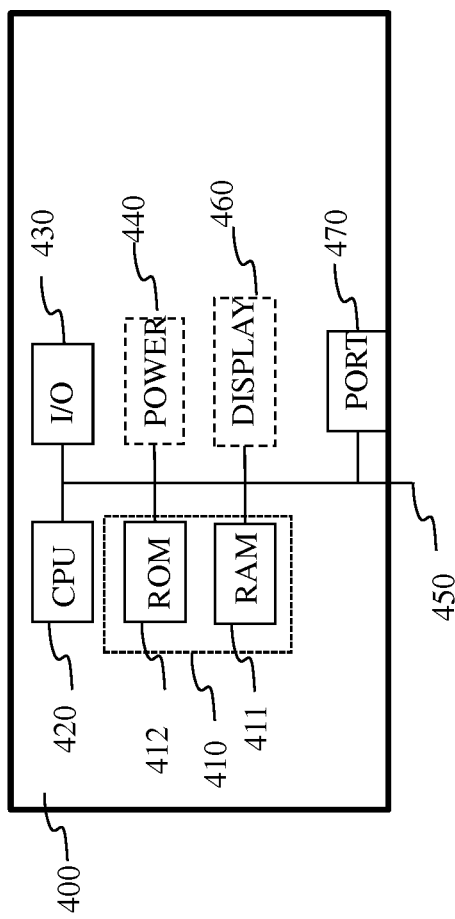
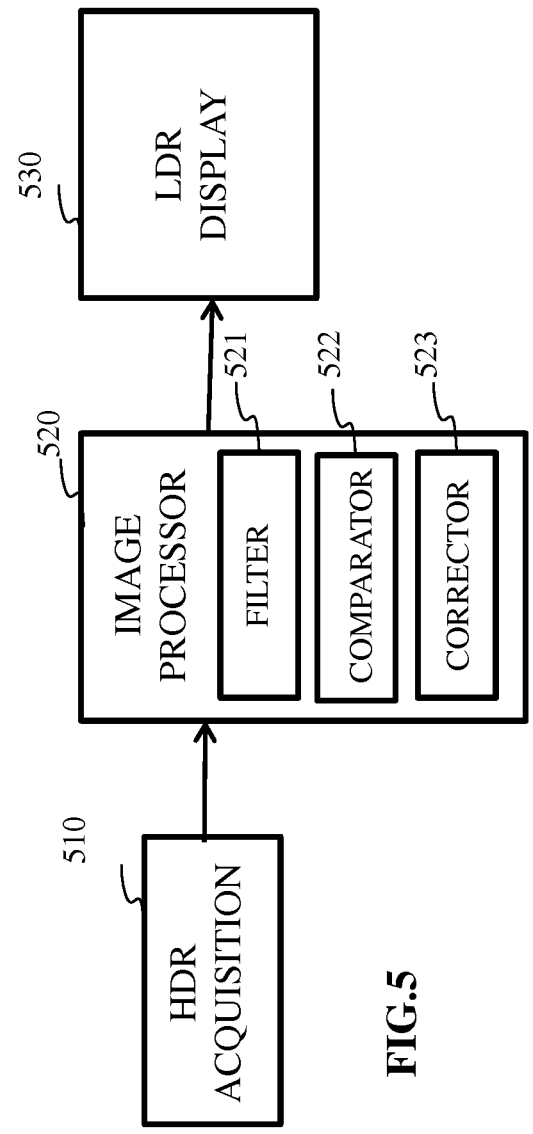

METHOD AND DEVICE FOR PROCESSING IMAGES

This application claims the benefit, under 35 U.S.C. § 365 of International Application PCT/EP2015/063523, filed Jun. 17, 2015, which was published in accordance with PCT Article 21(2) on Dec. 30, 2015, in English, and which claims the benefit of European Patent Application No. 14305998.8, filed Jun. 25, 2014, and European Patent Application No. 14306016.8, filed Jun. 27, 2014, the contents of which are hereby incorporated by reference in their entirety.

TECHNICAL FIELD

The present invention relates to a method and an apparatus for processing images of a video sequence. In particular the present invention relates to processing of a sequence of images in which LDR images are obtained from HDR images, for example by applying a tone mapping process.

BACKGROUND

The variation of light in a scene captured by an imaging device can vary greatly. For example, objects located in a shadow of the scene can appear very dark compared to an object illuminated by direct sunlight. The limited dynamic range and colour gamut provided by traditional low dynamic range (LDR) images often do not provide a sufficient range for accurate reproduction of the changes in luminance and colour within such scenes. Typically the values of components of LDR images representing the luminance or colour of pixels of the image are represented by a limited number of bits (typically 8, 10 or 12 bits). The limited range of luminance provided by such representation does not enable small signal variations to be effectively reproduced, in particular in bright and dark ranges of luminance.

High dynamic range imaging (also referred to as HDR or HDRI) enables a greater dynamic range of luminance between light and dark areas of a scene compared to traditional LDR images. This is achieved in HDR imaging by extending the signal representation to a wider dynamic range in order to provide high signal accuracy across the entire range. In HDR images, component values of pixels are usually represented with a greater number of bits (for example from 16 bits to 64 bits) including in floating-point format (for example 32-bit or 16-bit for each component, namely float or half-float), the most popular format being openEXR half-float format (16-bit per RGB component, i.e. 48 bits per pixel) or in integers with a long representation, typically at least 16 bits. Such ranges correspond to the natural sensitivity of the human visual system. In this way HDR images more accurately represent the wide range of luminance found in real scenes thereby providing more realistic representations of the scene. High Dynamic Range imaging is becoming widely used in both the computer graphics and image processing communities.

Some display devices, however have a limited dynamic range that is inadequate for reproducing the full range of light intensities provided by HDR imaging. To this end various techniques have been used to render HDR image data compatible with LDR type displays. Tone mapping, for instance, is a technique used to map one set of colors to another in order to approximate the appearance of high dynamic range images in a medium that has a more limited dynamic range. Tone Mapping Operators (TMOs) enables the wide range of values available in a HDR image to be reproduced on a LDR display (Low Dynamic Range).

There are two main types of TMOs: global and local operators.

Global operators use characteristics of a HDR frame, to compute a monotonously increasing tone mapping curve for the whole image. As a consequence, these operators ensure the spatial brightness coherency. However, they usually fail to reproduce finer details contained in the HDR frame. Local operators tone map each pixel based on its spatial neighborhood. These techniques increase local spatial contrast, thereby providing more detailed frames.

Applying a TMO separately to each frame of an input video sequence usually results in temporal incoherency. There are two main types of temporal incoherency: flickering artifacts and temporal brightness incoherency.

Flickering artifacts are due to the TMO and are caused by rapid changes of the tone mapping in successive frames. As a consequence, similar HDR luminance values are mapped to different LDR values. Such flickering artifacts due to the TMO are undesirable and should be reduced.

Temporal brightness incoherency includes short-term and long-term temporal brightness incoherency. Short-term temporal brightness incoherency appears when rapid changes of illumination condition (global or local) occur in a HDR scene. Applying a TMO without taking into account temporally close frames results in different HDR values being mapped to similar LDR values. Consequently, the tone mapping loses information on the scene that should have been preserved.

Finally long-term temporal brightness incoherency occurs when the brightness of the relative HDR frames are not preserved during the course of the tone mapping process. Consequently, frames perceived as the brightest in the HDR sequence are not necessarily the brightest in the LDR sequence. Unlike flickering artifacts and short-term temporal brightness incoherency, long-term temporal brightness incoherency does not necessarily appear through successive frames.

In summary, applying a TMO, global or local, to each frame separately of an HDR video sequence, results in temporal incoherency.

In an attempt to address such issues various approaches have been proposed. For example, solutions, based on temporal filtering have been proposed (Boitard R., Thoreau D., Bouatouch K., Cozot R.: *Temporal Coherency in Video Tone Mapping, a Survey*. In HDRi2013—First International Conference and SME Workshop on HDR imaging (2013), no. 1, pp. 1-6). Depending on the TMO, either the computed tone mapping curve or the variable that adapts the mapping to the picture is filtered. Examples of such variables are the geometric mean of a picture (which is an indication of the overall brightness of a picture), its maximum or minimum value etc. However, these techniques only work for global TMOs, since local TMOs have a non-linear and spatially varying tone mapping curve. In addition, when short-term temporal brightness incoherency occurs, these techniques filter both illumination conditions together resulting in tone mapping in a transition state that corresponds to neither of the illumination conditions of the original HDR scene.

For local TMOs, preserving temporal coherency consists in preventing high variations of the tone mapping over time and space. A solution, based on the GDC operator, has been proposed by Lee et al. (Lee C., Kim C.-S.: *Gradient Domain Tone Mapping of High Dynamic Range Videos*. In 2007 IEEE International Conference on Image Processing (2007), no. 2, IEEE, pp. III-461-III-464.).

First, this technique performs a pixel-wise motion estimation for each pair of successive HDR frames and the resulting motion field is then used as a constraint of temporal coherency for the corresponding LDR frames. This constraint ensures that two pixels, associated through a motion vector, are tone mapped similarly.

Despite the visual improvement resulting from this technique, several shortcomings still exist. First, this solution depends on the robustness of the motion estimation. When this estimation fails (occlusion of objects), the temporal coherency constraint is applied to pixels belonging to different objects, usually resulting in ghosting artifacts. Such a motion estimation problem will be referred to as non-coherent motion vector. This issue also arises when Short-term temporal brightness incoherency occurs. In this case, the technique levels the tone mapped value to be closer to the one in the previous frame in the LDR sequence. Moreover, this technique is designed for only one local TMO, the GDC operator, and cannot be extended to other TMOs.

Finally, Guthier et al (Guthier, B., Kopf, S., Eble, M., & Effelsberg, W. (2011). *Flicker reduction in tone mapped high dynamic range video.* In Proc. of IS&T/SPIE Electronic Imaging (EI) on Color Imaging XVI: Displaying, Processing, Hardcopy, and Applications (p. 78660C-78660C-15)) designed a technique that reduces flickering artifacts by post-processing the output of any TMO using only information from the tone mapped sequence.

This method compares the geometric mean (which is an indication of the overall brightness of a picture) between successive frames of a video sequence. A flickering artifact is detected if this difference is greater than a threshold. As soon as an artifact is located, it is reduced using an iterative brightness adjustment until reaching the brightness threshold.

This solution detects any temporal artifacts. Consequently, brightness changes in the HDR video sequence, that are greater than the brightness threshold, are reduced during the tone mapping process resulting in short-term temporal brightness incoherency. In addition, temporal incoherencies are only considered in a global fashion and local temporal incoherencies are ignored.

SUMMARY

The present invention has been devised with the foregoing in mind. A general aspect of the invention comprises temporally decomposing successive frames of the HDR source and the corresponding frames of the LDR tone mapped sequence and performing a comparison between the HDR and LDR frequency sub-bands According to a first aspect of the invention there is provided a method of processing images of a video sequence, comprising performing temporal frequency decomposition of two temporally successive HDR images, comprising a current HDR image and a preceding HDR image to obtain a high HDR temporal frequency sub-band and a low HDR temporal frequency sub-band; performing temporal frequency decomposition of two temporally successive LDR images, comprising a current LDR image and a preceding LDR image, obtained respectively from the two temporally successive HDR images, to obtain a high LDR frequency sub-band and a low LDR frequency sub-band; applying edge detection to obtain a HDR edge map from the high HDR temporal-frequency sub-band, and a LDR edge map from the high LDR temporal-frequency sub-band, and modifying the current LDR image on the basis of a comparison between the high HDR temporal-frequency sub-band and the high LDR temporal-frequency sub-band wherein the comparison is performed on the obtained HDR and LDR edge maps, for example to detect for differences between corresponding pixels of the edge maps.

Comparison between the HDR and LDR frequency sub-bands enables detection of temporal incoherency on a pixel-wise basis. Temporal incoherency in successive frames of a tone-mapped video sequence, for example, can be reduced. Comparison of the frequency sub-bands also enables the appearance of ghosting artifacts to be reduced.

High temporal frequency sub-band for HDR or LDR signifies a temporal frequency sub-band of higher frequency range than the low temporal frequency sub-band. It follows that low temporal frequency sub-band for HDR or LDR signifies a temporal frequency sub-band of lower frequency range than the high temporal frequency sub-band.

In an embodiment the method includes obtaining a HDR edge map based on at least one HDR threshold from the high HDR temporal-frequency sub-band and a LDR edge map based on at least one LDR threshold from the high LDR temporal-frequency sub-band and the comparison is performed on the obtained HDR and LDR edge maps.

In an embodiment edge detection comprises applying a canny filter.

In an embodiment the method includes distinguishing between the presence of a flickering artifact and the presence of a short term brightness incoherency from the edge map comparison In an embodiment the at least one HDR threshold for obtaining the HDR edge map and/or the at least one LDR threshold for obtaining the LDR edge map is user defined.

In an embodiment the at least one HDR threshold for obtaining the HDR edge map is based on the low HDR temporal-frequency sub-band and/or the at least one LDR threshold for obtaining the LDR edge map is based on the low LDR temporal-frequency sub-band.

In an embodiment the threshold per pixel of the image is dependent upon the value in the respective low temporal-frequency sub-band.

In an embodiment performing temporal frequency decomposition comprises performing motion compensated temporal filtering on the basis of motion vectors determined from motion estimation of two temporally successive HDR frames or corresponding LDR frames.

Preferably the motion vectors are obtained from motion estimation of two temporally successive HDR frames. This provides more accurate motion estimation.

In an embodiment the method includes performing motion estimation between the two temporally successive HDR images to provide motion vectors for performing the temporal frequency decomposition of the HDR images and the temporal frequency decomposition tone mapped LDR images. Using motion estimation enables detection of temporal incoherency artifacts throughout the spatial and temporal domain.

In an embodiment modifying the current LDR image comprises reducing a flickering artifact below the LDR threshold or increasing a short-term brightness coherency over the LDR threshold.

It will be appreciated that the invention may be applied to any process for obtaining a LDR image from a HDR image. Any dynamic range scaling process may be applied to obtain an LDR image from a corresponding HDR image. In an embodiment the current LDR image and the preceding LDR image are each obtained respectively from the current HDR image and the preceding HDR image by a tone mapping process. It will be appreciated that in such embodiments any tone mapping operator may be applied.

According to a second aspect of the invention there is provided a device for processing images of a video sequence, comprising a filter for performing temporal frequency decomposition of two temporally successive HDR images, comprising a current HDR image and a preceding HDR image to obtain a high frequency HDR temporal frequency sub-band and a low frequency HDR temporal frequency sub-band; and temporal frequency decomposition of two temporally successive LDR images, obtained respectively from the two temporally successive HDR images, to obtain a high frequency LDR frequency sub-band and a low frequency LDR frequency sub-band; and a comparator for performing a comparison between the high HDR temporal-frequency sub-band and the high LDR temporal-frequency sub-band; and an image corrector for modifying the current LDR image on the basis of the comparison between the high HDR temporal-frequency sub-band and the high LDR temporal-frequency sub-band. The device is provided with an edge map generator for obtaining a HDR edge map based on at least one HDR threshold from the high HDR temporal-frequency sub-band and a LDR edge map based on at least one LDR threshold from the high LDR temporal-frequency sub-band, and the comparator is configured to perform the comparison on the obtained HDR and LDR edge maps to detect for differences between corresponding pixels.

In an embodiment the edge map generator comprises a Canny filter.

In an embodiment the Canny filter including a smoothing module, a thresholding module and an edge interpolation modulator.

In an embodiment, the at least one HDR threshold for obtaining the HDR edge map and/or the at least one LDR threshold for obtaining the LDR edge map is user defined.

In an embodiment, the at least one HDR threshold for obtaining the HDR edge map is based on the low frequency HDR temporal-frequency sub-band and/or the at least one LDR threshold for obtaining the LDR edge map is based on the low frequency LDR temporal-frequency sub-band.

In an embodiment, the filter is configured to perform motion compensated temporal filtering on the basis of motion vectors determined from motion estimation of two temporally successive HDR frames or corresponding LDR frames.

According to a further aspect of the invention there is provided a display device comprising a device in accordance with any embodiment of the second aspect of the invention for processing images of a video sequence; and a display for displaying LDR images.

Embodiments of the invention help to address both flickering artifacts and short-term incoherency artifacts since it uses the HDR sub-band to detect the temporal changes (or lack of) illumination condition (global or local) in the HDR sequence to preserve them in the LDR sequence.

At least parts of the methods according to embodiments of the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or 'system'. Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RE signal.

BRIEF DESCRIPTION OF THE DRAWINGS

Embodiments of the invention will now be described, by way of example only, and with reference to the following drawings in which:

FIG. 4 is a block diagram of a processing device in which one or more embodiments of the invention can be implemented; and FIG. 5 is a block diagram of an example of an electronic device in which one or more embodiments of the invention can be implemented.

DETAILED DESCRIPTION

Temporal incoherency artifacts are global or local changes (or lack of) of brightness in successive frames of a video sequence. Two types of temporal incoherency which may be addressed by embodiments of the invention as described herein are flickering artifacts (in which there is a lack of change of brightness in the HDR sequence while a change of brightness occurs in the LDR sequence) and short-term brightness incoherencies (in which there is a change of brightness in the HDR sequence while no change of brightness occurs in the LDR sequence).

Figure 1:
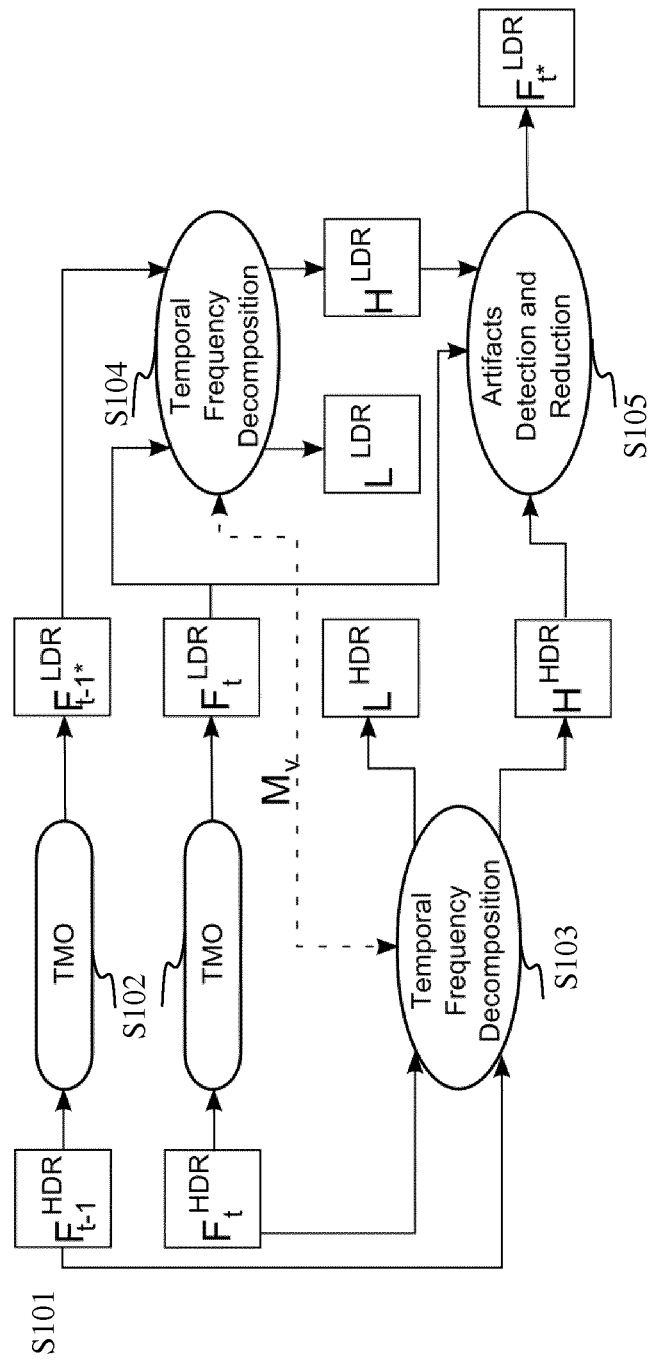
FIG. 1 is a schematic block diagram of method of processing images of a video sequence according to a first embodiment of the invention.

FIG. 1 is a schematic block diagram illustrating steps of a method for processing images of a video sequence in accordance with a first embodiment of the invention.

The method begins in step S101 with the acquisition of HDR image data. The HDR image data in the present example is representative of a video sequence of images. The HDR image data may, for example, be acquired directly from an imaging device such as a video camera, acquired from memory on which it is stored, the memory may be located locally or remotely, or received via a wireless or wired communication line.

As used herein the term "HDR image" or "HDR frame" refers to any HDR image or frame that comprises high dynamic range data in floating point (float or half float), fixed point or long representation integer format typically represented in by a number of bits greater than 16.

In the illustrated example of FIG. 1, two temporally successive HDR frames $F^{HDR}_{t-1}$ and $F^{HDR}_{t}$ are acquired from a HDR video sequence for processing: a current HDR frame $F^{HDR}_{t}$ (at time t) and its temporally preceding HDR frame $F^{HDR}_{t-1}$ (at time t−1).

In step S102 the two temporally successive HDR frames $F^{HDR}_{t-1}$ and $F^{HDR}_{t}$ are tone mapped by a tone mapping process using any TMO to obtain two corresponding tone mapped LDR images, $F^{LDR}_{t-1}$ and $F^{LDR}_t$ a current LDR frame $F^{LDR}_t$ (at time t) and its temporally preceding LDR frame $F^{LDR}_{t-1}$ (at time t−1). The preceding tone mapped frame ($F^{LDR}_{t-1}$) may have already undergone temporal incoherency reduction, as a current LDR frame in a previous iteration of the process according to embodiments of the invention, in which case it is denoted ($F^{LDR*}_{t-1}$ in FIG. 1).

Motion estimation is performed between the preceding HDR frame $F^{HDR}_{t-1}$ and the current HDR frame $F^{HDR}_t$ of the HDR video sequence. The Motion vectors (Mv) obtained from the motion estimation are used to perform Motion Compensated Temporal Filtering (MCTF) in step S103 on the two successive HDR frames $F^{HDR}_{t-1}$ and $F^{HDR}_t$ of the HDR video sequence. This process involves decomposing the two successive HDR frames $F^{HDR}_{t-1}$ and $F^{HDR}_t$ into two temporal frequency sub-bands: a higher frequency sub-band, noted generally as a high frequency sub-band ($H^{HDR}$) and a lower frequency sub-band, noted generally as a low frequency sub-band ($L^{HDR}$).

Similarly, MCTF is performed in step S104 on the preceding and current frames $F^{LDR*}_{t-1}$ and $F^{LDR}_t$ of the tone mapped LDR video sequence corresponding to the two successive HDR frames $F^{HDR}_{t-1}$ and $F^{HDR}_t$. The MCTF applied to the preceding and current frames $F^{LDR*}_{t-1}$ and $F^{LDR}_t$ of the tone mapped LDR video sequence uses the same Motion vectors as those applied in the MCTF of the corresponding two successive HDR frames $F^{HDR}_{t-1}$ and $F^{HDR}_t$ of the HDR video sequence. Consequently two temporal frequency sub-bands are obtained for the LDR frames: a higher (high) frequency sub-band ($H^{LDR}$) and a lower (low) frequency sub-band ($L^{LDR}$).

While it is preferable, for better accuracy, to obtain the motion vectors from motion estimation performed on two successive HDR frames, in some embodiments of the invention the motion vectors may be obtained from motion estimation performed on two successive LDR frames.

The high frequency temporal-frequency sub-bands obtained from both the LDR sequence and the HDR sequence ($H^{LDR}$ and $H^{HDR}$) are used in step S105 to detect temporal incoherency artifacts. Using this detection, the current LDR frame of the video sequence $F^{LDR}_t$ is modified to reduce those artifacts. A processed current tone mapped frame $F^{LDR*}_t$ is obtained. It may be noted that further processing of the low frequency temporal frequency sub-bands resulting from the sub-band decomposition is not mandatory.

A process of temporal frequency decomposition as applied in steps S103 and S104, according to an embodiment of the invention will be described with reference to FIG. 2.

Figure 2:
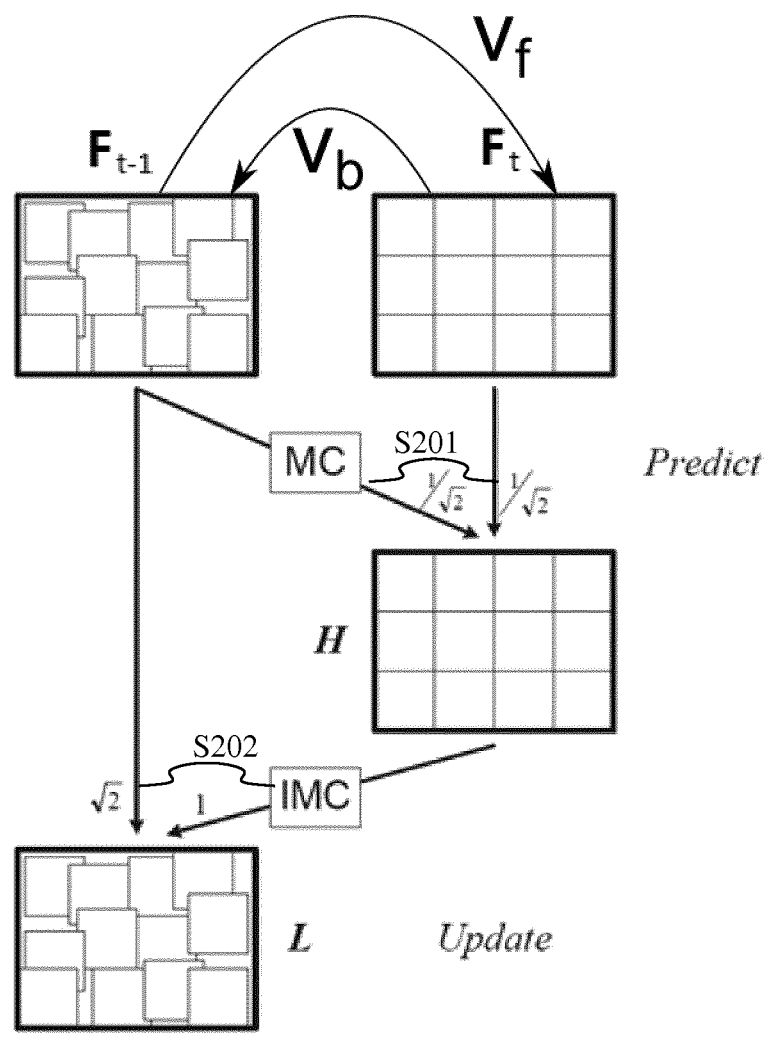
FIG. 2 is a schematic diagram of a method of performing temporal sub-band decomposition of two frames using a Motion Compensation (MC) according to an embodiment of the invention.

In the example of FIG. 2, the process of temporal-frequency decomposition of HDR frames $F^{HDR}_{t-1}$ and $F^{HDR}_t$ or corresponding tone mapped LDR frames $F^{LDR}_{t-1}$ and $F^{HDR}_t$ generally referenced, in FIG. 2 as $F_{t-1}$ and $F_t$, comprises applying orthonormal transforms using a backward motion vector, $v_b$ and a forward motion vector $v_f$, obtained from Motion estimation between the preceding HDR frame $F^{HDR}_{t-1}$ and the current HDR frame $F^{HDR}_t$, to obtain respectively in steps S201 and S202 the high temporal-frequency subband H and low temporal-frequency subband L:

$$H(n) = \frac{F_t(n) - F_{t-1}(n + v_b)}{\sqrt{2}} \quad \text{(step S201)}$$

$$L(p) = \sqrt{2} \times F_{t-1}(p) - H(p+v_f) \quad \text{(step S202)}$$

where H and L are respectively the high and low temporal-frequency sub-bands obtained at the LDR level or the HDR level, $v_b$ and $v_f$ are respectively the backward and forward motion vectors obtained from motion estimation between the temporally successive HDR frames while n is the pixel position in frame $F_t$ and p corresponds to $n+v_b$.

An example of an embodiment in accordance with the invention for implementation of the Artifacts Detection and Reduction function of step S105 of FIG. 1 will be described with reference to FIG. 3. The high temporal-frequency sub-band at the LDR level $H^{LDR}$ and the high temporal-frequency sub-band at the HDR level $H^{HDR}$ each uses a respective threshold in steps S311 and S321, respectively, to create a respective edge map $E^{HDR}$ and $E^{LDR}$:

$$E^{HDR}(n) = \begin{cases} 1 & \text{if } H^{HDR}(n) > HDR \text{ Threshold} \\ 0 & \text{if } H^{HDR}(n) \leq HDR \text{ Threshold} \end{cases} \quad \text{(A)}$$

$$E^{LDR}(n) = \begin{cases} 1 & \text{if } H^{LDR}(n) > LDR \text{ Threshold} \\ 0 & \text{if } H^{LDR}(n) \leq LDR \text{ Threshold} \end{cases} \quad \text{(B)}$$

The two edge maps are then compared with one another in step S330 to detect for edge differences and if a difference is detected, then it is considered that a temporal incoherency artifact is present. Several cases may be distinguished as summarized in the example of Table 1:

TABLE 1

Detection of temporal incoherency

| $E^{HDR}$(n) | $E^{LDR}$(n) | Problem? |
|---|---|---|
| 0 | 0 | No issue |
| 0 | 1 | A difference that was not present in the HDR sequence was created during the tone mapping process. Flickering Artifact! |
| 1 | 0 | A difference that was present in the HDR sequence has been suppressed during the tone mapping process. Short-term Brightness incoherency! |
| 1 | 1 | No issue |

To correct for any difference occurring in the edge maps, the current tone mapped frame ($F^{LDR}_t$) is corrected in step S340 at each required pixel location (x,y) so as to reduce a flickering artifact below the threshold or a short-term brightness incoherency over the threshold.

While table 1 presents an example of binary edge maps in which the obtained values for $E^{HDR}$(n) and $E^{LDR}$(n) are either 1 or 0, it will be appreciated that in other embodiments of the invention, a plurality of thresholds may be applied to the HDR and LDR high temporal-frequency sub-bands to obtain the corresponding edge maps. In the case where a plurality of different thresholds are used to obtain each edge map, respective HDR and LDR edge maps indicating the strength of the edges are obtained. If the strength is different between the HDR and LDR high frequency subband, then the current LDR image is modified on the basis of the difference in strength differences.

The HDR Threshold and LDR threshold may be computed in several ways.

For example, in one embodiment the thresholds are user-defined.

In another embodiment, the thresholds are derived respectively from the two low frequency sub-bands ($L^{HDR}$ and $L^{LDR}$). In such a case, there is a threshold per pixel depending on the value in the low frequency sub-band.

Application of a correct edge difference function in accordance with an embodiment of the invention will now be described. In the example of Table 1, there are two cases that should be addressed. First, no temporal edges exist between the two temporally successive HDR frames while there was an edge in the corresponding temporally successive LDR frames. This corresponds to a flickering artifact introduced by the application of the TMO. In the example this artifact is referred to as case "FA". Second, a temporal edge exists between the two temporally successive HDR frames while none existed in the temporally successive LDR frames. This is a short-term temporal brightness incoherency. In the example this artifact is referred to as case "BI".

According to an embodiment, artifacts are reduced in such a way that both HDR and LDR edge maps $E^{HDR}$ and $E^{LDR}$ have the same value. For example, to respect the following expression:

$$H^{LDR}(n) = \frac{F_t^{LDR*}(n) - F_{t-1}^{LDR}(n+v_b)}{\sqrt{2}} = LDR \text{ Threshold}$$

where $F_t^{LDR*}$ is the post-processed current LDR frame in which artifacts have been reduced and is computed as follows:

$$F_t^{LDR*}(fa) = LDR \text{ Threshold} * \sqrt{2} + F_{t-1}^{LDR}(fa + fav_b)$$

$$F_t^{LDR*}(bi) = LDR \text{ Threshold} * \sqrt{2} + F_{t-1}^{LDR}(bi + biv_b) + \text{delta}$$

Where "fa", and "bi", represent the pixels where flickering artifacts "FA" and temporal brightness incoherency artifacts "BI", respectively have been detected. $fav_b$ and $biv_b$, correspond to the motion vectors associated with the pixels "fa" and "bi" respectively. Finally "delta" is a quantization step applied to put the resulting value above the threshold so as to respect the inequalities in equations (A) and (B).

Figure 3:
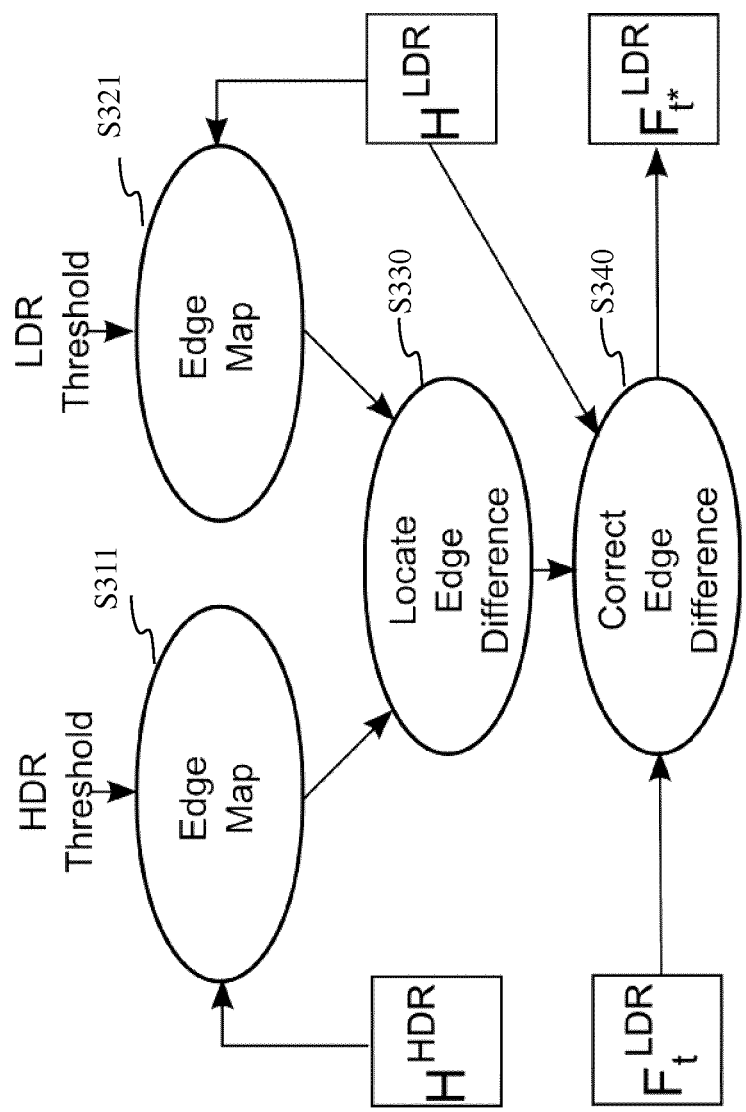
FIG. 3 is a schematic diagram illustrating steps of a method for performing comparison of frequency sub-bands according to an embodiment of the invention.

In FIGS. 1 to 3, the illustrated modules correspond to functional units, which may or may not correspond to distinguishable physical units. For example, a plurality of such modules may be associated in a unique component or circuit, or correspond to a software module. Moreover, a module may potentially be composed of separate physical entities or software functionalities.

Devices compatible with embodiments of the invention may be implemented either solely by hardware, solely by software or by a combination of hardware and software. In terms of hardware for example dedicated hardware, may be used, such as, for example ASIC «Application Specific Integrated Circuit», FPGA «Field-Programmable Gate Array» or VLSI, «Very Large Scale Integration»; or by using several integrated electronic components embedded in a device or from a combination of hardware and software components.

In a further embodiment of the invention an edge detection technique is applied to detect the edges present in the HDR and LDR high frequency temporal sub-bands ($H^{LDR}$ and $H^{HDR}$) to obtain respective edge maps. This involves detecting the edges present in the high-frequency sub-band which corresponds to changes in luminosity between the current image and the preceding image and which indicates temporal artifacts. To achieve this a Canny filter is used. A canny filter enables edge detection and provides a more precise localization of edges compared with a Laplace filter for example. The first step of the Canny filter process involves the reduction of noise in the image by smoothing. The smoothing may be performed for example by applying a Gaussian. Then in a subsequent step edges are detected by applying a gradient. In a subsequent step thresholding is applied; The threshold can be modified for example by a factor α. Then the detected edges are refined by interpolation in order to find where the gradient normal has a local maximum. Non-maximas can be suppressed, and the HDR and LDR edge maps are obtained for comparison for detection and correction of artifacts in step S105.

FIG. 4 is a schematic block diagram representing functional components of an electronic device 400 in which one or more embodiments of the invention may be implemented.

The electronic device 400 includes memory 410, one or more processing units (CPUs) 420, an input/output interface 430 for transfer of data from and to an application and an interface port 470 for connection to an external device or network. The components communicate over one or more communication buses 450.

Memory may include high speed random access memory (RAM) 411 and read only memory (ROM) 412. A register of memory may correspond to portion of low capacity (some bits) or to a high capacity portion (for example entire computer program code or large amounts of compressed or uncompressed data) of any of the memories of the device. ROM 412 stores at least program code and parameters. Algorithms of the methods for processing a sequence of images according to embodiments of the invention may be stored in ROM 412.

The one or more CPUs 420 run various software programs and/or sets of instructions stored in memory 410 to perform functions of the processing device 400 and to process data. RAM 411 comprises, in a register, a program executed by the CPU 420 and uploaded after switch on of the device 400, input data in a register, intermediate data at different states of the algorithm in a register, and other variables used for the execution of the algorithm in a register. When switched on, the CPU 420 uploads a software program from the RAM 411 and executes the corresponding instructions.

Images to be processed in accordance with embodiments of the invention may be stored in the memory 410. Processed images obtained from the methods in accordance with embodiments of the invention may be stored in the memory 410.

Memory 410 may include non-volatile memory, such as one or more magnetic disk storage devices, flash memory devices or other non-volatile solid state memory devices. In some embodiments, the memory may further include storage remotely located from the one or more CPUs 420. For example storage accessible via an interface and/or a communication network.

In some embodiments the device is provided with a power source such as a battery 440. According to alternative embodiments, the power source may be external to the device.

The device may be provided with a display 460, for example a LDR compatible display for display of the processed LDR images obtained from methods according to embodiments of the invention. In other embodiments the display is located remotely to the device 400 and processed images are transferred to the display, for example by the port 470 via a wired or wireless data communication interface or via a wired or wireless network connection. The HDR images may be received by the port 470 via a wired or wireless communication interface or via a wired or wireless network connection.

FIG. 5 is a schematic block diagram illustrating components of an electronic system in which embodiments of the invention may be implemented. The electronic system comprises an image acquisition module 510 for acquiring HDR images, an image processor 520 for processing the HDR images in accordance with one or more embodiments of the invention and a display device compatible with the display of LDR images. The HDR acquisition device 510 may be for example a video recorder configured to acquire images in a HDR format, or a medium on which HDR images are stored.

The image processor 520 comprises a filter 521 for performing temporal frequency decomposition of two temporally successive HDR images $F^{HDR}_{t-1}$ and $F^{HDR}_t$, comprising a current HDR image $F^{HDR}_{t-1}$ and $F^{HDR}_t$ and a preceding HDR image $F^{HDR}_{t-1}$ to obtain a high HDR temporal frequency sub-band $H^{HDR}$ and a low HDR temporal frequency sub-band $L^{HDR}$; and temporal frequency decomposition of two temporally successive LDR images $F^{LDR}_{t-1}$ and $F^{LDR}_t$, obtained respectively from the two temporally successive HDR images, to obtain a high LDR temporal-frequency sub-band $H^{LDR}$ and a low LDR temporal-frequency sub-band $L^{LDR}$; a comparator 522 for performing a comparison between the high HDR temporal-frequency sub-band and the high LDR temporal-frequency sub-band $H^{HDR}$ and $H^{LDR}$; and an image corrector 523 for modifying the current LDR image $F^{LDR}_t$ on the basis of the comparison between the high HDR temporal-frequency sub-band $H^{HDR}$ and the high LDR temporal-frequency sub-band $H^{LDR}$. The processed images are then transferred to LDR display device 530 for display.

Embodiments of the invention enable detection of flickering artifacts and short-term brightness incoherencies and reduction of such effects. Moreover, embodiments of the invention can be used to distinguish flickering artifacts from short-term brightness coherency. The invention is generic to any tone mapping or other HDR-LDR scaling technique. In the case of tone mapping embodiments of the invention help to detect ghosting artifacts that have been introduced by the tone mapping operator used in the tone mapping process.

Although the present invention has been described hereinabove with reference to specific embodiments, it will be appreciated that the present invention is not limited to the specific embodiments, and modifications will be apparent to a skilled person in the art which lie within the scope of the present invention.

For instance, it will be appreciated that while embodiments of the invention have been described with respect to tone mapping techniques for transforming a HDR image into a LDR image, it will be appreciated that the invention is not limited to tone mapping techniques and may be applied to any technique for converting a HDR image to a LDR compatible image.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method of processing images of a video sequence, comprising:
   a) performing temporal frequency decomposition of two temporally successive High-Dynamic-Range images, denoted HDR images, comprising a current HDR image and a preceding HDR image to obtain a high temporal frequency sub-band, denoted high HDR temporal frequency sub-band, and a low temporal frequency sub-band, denoted low HDR temporal frequency sub-band;
   b) performing temporal frequency decomposition of two temporally successive images, denoted LDR images, obtained respectively from the two temporally successive HDR images, to obtain a high temporal-frequency sub-band, denoted high LDR temporal-frequency sub-band and a low temporal frequency sub-band, denoted low LDR temporal frequency sub-band;
   said LDR images being lower dynamic range depiction of the HDR images;
   c) obtaining an edge map, denoted a HDR edge map, from the high HDR temporal-frequency sub-band, and an edge map, denoted LDR edge map from the high LDR temporal-frequency sub-band;
   d) comparing the HDR and LDR edge maps to detect differences between corresponding pixels; and
   e) correcting the current LDR image at least one pixel location, for a difference occurring in the HDR and LDR edge maps at said at least one pixel location (x,y), said correcting distinguishing between the presence of a flickering artifact and the presence of a short term brightness incoherency from said edge map comparison.

2. The method according to claim 1, wherein the HDR edge map is obtained, based on at least one HDR threshold, from the high HDR temporal-frequency sub-band, and the LDR edge map is obtained, based on at least one LDR threshold, from the high LDR temporal-frequency sub-band.

3. The method according to claim 1, wherein the HDR edge map is obtained, by applying a Canny filter to the high HDR temporal-frequency sub-band, and the LDR edge map is obtained, by applying a Canny filter to the high LDR temporal-frequency sub-band.

4. The method according to claim 3 wherein edge detection by applying a Canny filter includes steps of smoothing, thresholding and interpolation.

5. The method according to claim 1 wherein performing temporal frequency decomposition comprises performing motion compensated temporal filtering on the basis of motion vectors determined from motion estimation of two temporally successive HDR frames or two temporally successive corresponding LDR frames.

6. The method according to claim 1 wherein correcting the current LDR image comprises reducing a flickering artifact below the LDR threshold or increasing a short-term brightness coherency over the LDR threshold.

7. The method according to claim 1 wherein the current LDR image and the preceding LDR image are obtained respectively from the current HDR image and the preceding HDR image by a tone mapping process.

8. A device for processing images of a video sequence, comprising:
   a filter for performing temporal frequency decomposition of two temporally successive images, denoted HDR images, comprising a current HDR image and a preceding HDR image to obtain a high temporal frequency sub-band, denoted high HDR temporal frequency sub-band, and a low temporal-frequency sub-band, denoted low HDR temporal-frequency sub-band; and temporal frequency decomposition of two temporally successive images, denoted LDR images, obtained respectively from the two temporally successive HDR images, to obtain a high temporal-frequency sub-band, denoted high LDR temporal-frequency sub-band, and a low temporal-frequency sub-band, denoted low LDR temporal-frequency sub-band;

said LDR images being lower dynamic range depiction of the HDR images;

an edge map generator for obtaining an edge map, denoted HDR edge map, from the high HDR temporal-frequency sub-band, and a edge map, denoted LDR edge map, from the high LDR temporal frequency sub-band;

a comparator for performing a comparison between the HDR and LDR edge maps to detect differences between corresponding pixels; and an image corrector for correcting the current LDR image at least one pixel location, for a difference occurring in the HDR and LDR edge maps at said at least one pixel location (x,y), said correcting distinguishing between the presence of a flickering artifact and the presence of a short term brightness incoherency from said edge map comparison.

9. The device according to claim 8 wherein the edge map generator is configured to obtain an HDR edge map, based on at least one HDR threshold, from the high HDR temporal-frequency sub-band, and the LDR edge map based on at least one LDR threshold, from the high LDR temporal-frequency sub-band.

10. The device according to claim 8 wherein the edge map generator comprises a Canny filter.

11. The device according to claim 10 wherein the Canny filter includes a smoothing module, a thresholding module and an edge interpolation modulator.

12. The device according to claim 8, wherein the filter is configured to perform temporal frequency decomposition by performing motion compensated temporal filtering on the basis of motion vectors determined from motion estimation of two temporally successive HDR frames or two temporally successive corresponding LDR frames.

13. A display device comprising:
a device in accordance with claim 8 for processing images of a video sequence; and
a display for displaying LDR images.

14. A non-transitory program storage device, readable by a computer, tangibly embodying a program of instructions executable by the computer to perform a method comprising:

a) performing temporal frequency decomposition of two temporally successive High-Dynamic-Range images, denoted HDR images, comprising a current HDR image and a preceding HDR image to obtain a high temporal frequency sub-band, denoted high HDR temporal frequency sub-band, and a low temporal frequency sub-band, denoted low HDR temporal frequency sub-band;

b) performing temporal frequency decomposition of two temporally successive images, denoted LDR images, obtained respectively from the two temporally successive HDR images, to obtain a high temporal-frequency sub-band, denoted high LDR temporal-frequency sub-band and a low temporal frequency sub-band, denoted low LDR temporal frequency sub-band;

said LDR images being lower dynamic range depiction of the HDR images;

c) obtaining an edge map, denoted a HDR edge map, from the high HDR temporal-frequency sub-band, and a edge map, denoted LDR edge map from the high LDR temporal-frequency sub-band;

d) comparing the HDR and LDR edge maps to detect differences between corresponding pixels; and e) correcting the current LDR image at least one pixel location, for a difference occurring in the HDR and LDR edge maps at said at least one pixel location (x,y), said correcting distinguishing between the presence of a flickering artifact and the presence of a short term brightness incoherency from said edge map comparison.

* * * * *